United States Patent
Mikami et al.

[11] Patent Number: 5,839,533
[45] Date of Patent: Nov. 24, 1998

[54] APPARATUS FOR CONTROLLING ELECTRIC GENERATOR OF HYBRID DRIVE VEHICLE TO CONTROL REGENERATIVE BRAKE DEPENDING UPON SELECTED DEGREE OF DRIVE SOURCE BRAKE APPLICATION

[75] Inventors: Tsuyoshi Mikami, Toyota; Yutaka Taga, Aichi-ken, both of Japan

[73] Assignee: Toyota Jidosha Kabushiki Kaisha, Toyota, Japan

[21] Appl. No.: 834,859

[22] Filed: Apr. 10, 1997

[30] Foreign Application Priority Data

Apr. 11, 1996 [JP] Japan .................................. 8-089440

[51] Int. Cl.$^6$ ........................................................ B60L 1/02
[52] U.S. Cl. .......................... 180/165; 180/65.2; 180/65.3; 180/65.6
[58] Field of Search .................................. 180/65.2, 65.3, 180/65.6, 65.7, 65.1, 165

[56] References Cited

U.S. PATENT DOCUMENTS

| | | | |
|---|---|---|---|
| 4,196,587 | 4/1980 | Shiber | 60/414 |
| 4,591,016 | 5/1986 | Matthews | 180/165 |
| 4,671,577 | 6/1987 | Woods | 303/3 |
| 4,750,385 | 6/1988 | Yamamoto et al. | 74/866 |
| 5,166,584 | 11/1992 | Fukino et al. | 180/65.3 |
| 5,318,142 | 6/1994 | Bates et al. | 180/65.2 |
| 5,343,970 | 9/1994 | Severinsky | 180/65.2 |
| 5,365,431 | 11/1994 | Minezawa et al. | 180/65.1 |
| 5,392,664 | 2/1995 | Gogins | 74/117 |
| 5,492,192 | 2/1996 | Brooks et al. | 180/65.3 |
| 5,505,527 | 4/1996 | Gray, Jr. et al. | 303/3 |
| 5,615,933 | 4/1997 | Kidston et al. | 303/152 |
| 5,632,534 | 5/1997 | Knechtges | 303/152 |
| 5,637,987 | 6/1997 | Fattic et al. | 180/65.3 |
| 5,644,200 | 7/1997 | Yang | 180/65.2 |
| 5,707,115 | 1/1998 | Bodie et al. | 303/3 |
| 7,734,238 | 3/1998 | Yanagisawa et al. | 318/139 |

FOREIGN PATENT DOCUMENTS 6-55941  3/1994  Japan .
6-70406  3/1994  Japan .

Primary Examiner—Joseph D. Pape
Assistant Examiner—Clovia Hamilton
Attorney, Agent, or Firm—Oblon, Spivak, McClelland, Maier & Neustadt, P.C.

[57] ABSTRACT

Apparatus for controlling a drive source brake force to be applied to a hybrid drive vehicle including an engine, an electric motor, and a transmission, the apparatus including a manually operated member for selecting one of different degrees of application of a drive source brake to the vehicle, an electric generator driven by a kinetic energy of the vehicle to generate an electric energy and apply as the drive source brake a regenerative brake force corresponding to the generated electric energy to the vehicle, and an electricity generation control device for controlling the electric energy generated by the electric generator, depending upon the selected degree of the drive source brake application. The apparatus may include a shift control device for changing the speed ratio of the transmission so that an engine brake force produced by the engine as the drive source brake is controlled depending upon the selected degree of the drive source brake application. The regenerative brake or engine brake is selectively applied depending upon the electric energy amount stored in an electric energy storage device.

11 Claims, 10 Drawing Sheets

FIG. 5

| MODE | CLUTCHES | | ENGINE 12 | STORAGE DEVICE 58 | MODE NOMENCLATURE |
|---|---|---|---|---|---|
| | CE1 | CE2 | | | |
| 1 | OFF | ON | OFF | DISCHARGED | MOTOR DRIVE |
| 2 | ON | ON | ON | NO ENG. CSMD | ENGINE DRIVE |
| 3 | ON | ON | ON | CHARGED | ENGINE DRIVE + CHARGING |
| 4 | ON | ON | ON | DISCHARGED | ENGINE · MOTOR DRIVE |
| 5 | ON | OFF | ON | CHARGED | VEHICLE START BY ENGINE |
| 6 | OFF | ON | OFF | CHARGED | REGENERATIVE BRAKING |
| 7 | ON | OFF | ON | NO ENG. CSMD | ELECTRIC NEUTRALITY |
| 8 | ON | ON | OFF | NO ENG. CSMD | ENGINE BRAKING |
| 9 | ON | ON | START | DISCHARGED | ENGINE STARTING |

Map1 CORRESPONDING TO DRIVE POSITION "4th"

Map2 CORRESPONDING TO DRIVE POSITION "3rd"

Map3 CORRESPONDING TO DRIVE POSITION "2nd"

Map4 CORRESPONDING TO DRIVE POSITION "1st"

APPARATUS FOR CONTROLLING ELECTRIC GENERATOR OF HYBRID DRIVE VEHICLE TO CONTROL REGENERATIVE BRAKE DEPENDING UPON SELECTED DEGREE OF DRIVE SOURCE BRAKE APPLICATION

The present application is based on Japanese Patent Application No. 8-89440 filed Apr. 11, 1996, the content of which is incorporated hereinto by reference.

BACKGROUND OF THE INVENTION

1. Field of the Invention

The present invention relates in general to a hybrid drive motor vehicle, and more particularly to an apparatus for controlling a drive source brake (an engine brake and a regenerative brake) to be applied to such a hybrid drive motor vehicle by utilizing an electric generator.

2. Discussion of the Related Art

There is known a hybrid drive motor vehicle including (a) a drive power source including an engine operated by combustion of an engine, and an electric motor operated by an electric energy stored in an electric energy storage device, and (b) an automatic transmission which is disposed in a power transmitting path between the engine and drive wheels of a motor vehicle and whose speed ratio is variable. For such a hybrid drive motor vehicle, there is known an engine brake control apparatus including (i) engine braking degree selecting means for selecting one of a plurality of degrees of engine brake application to the motor vehicle, and (ii) engine braking shift control means for selecting the speed ratio of the automatic transmission depending upon the selected degree of engine brake application, so that an engine brake is applied to the motor vehicle as a result of operation of the engine by a kinetic energy of the motor vehicle transferred to the engine through the automatic transmission, such that a force of the engine brake changes with the selected speed ratio of the automatic transmission.

An example of such an engine brake control apparatus is disclosed in JP-A-6-55941, wherein an automatic transmission is disposed between an engine and a motor/generator. When a shift lever which functions as the engine brake selector means is placed in a second "2" position, the automatic transmission is placed in a second-speed position. When the shift lever is placed in a low "L" position, the automatic transmission is placed in a first-speed position. Thus, the engine brake force to be applied to the vehicle changes with the selected position or selected speed ratio of the automatic transmission. The brake force by the engine is generated by a pump action and friction loss of the engine, and therefore the engine brake force increases with an increase in the operating speed of the engine. Accordingly, the engine brake force increases with an increase in the speed ratio of the automatic transmission, which is the input speed divided by the output speed of the automatic transmission.

When the motor/generator is driven as the electric generator by a kinetic energy of the motor vehicle, the electric generator (motor/generator) produces a regenerative braking torque corresponding to the amount of an electric energy generated by the electric generator. Consequently, a brake force corresponding to the regenerative braking torque is applied to the motor vehicle. This brake force has the same effect as the engine brake force indicated above. In the engine brake control apparatus disclosed in the above-identified document JP-A-6-55941, the motor/generator is driven with a maximum torque to generate an electric energy, when the hybrid drive vehicle is in an engine braking mode.

In the present application, the "engine brake" based on the pump action and friction loss of the engine and the "regenerative brake" based on the regenerative braking torque generated by the motor/generator (functioning as the electric generator or dynamo) are generically referred to as "drive source brake". In other words, the term "drive source brake" is interpreted to include both the engine brake and the regenerative brake.

However, the conventional engine brake control apparatus adapted to control the engine brake force by shifting the automatic transmission suffers from a low response due to a comparatively long time required for the automatic transmission to be shifted from one position to another.

SUMMARY OF THE INVENTION

It is therefore an object of the present invention to provide an apparatus for controlling a drive source brake to be applied to a hybrid drive motor vehicle, which apparatus permits the application of the drive source brake, with a high response to an operation of manually operated means for selecting one of different degrees of drive source brake application to the vehicle.

The above object may be achieved according to a first aspect of this invention, which provides an apparatus for controlling a drive source brake force to be applied to a hybrid drive vehicle comprising a drive wheel, a drive power source for driving the drive wheel, and a transmission, the drive power source including an engine operated by combustion of a fuel and an electric motor operated with an electric energy, and the transmission being disposed in a power transmitting path between the engine and the drive wheel, the apparatus comprising: (a) manually operated means for selecting one of a plurality of different degrees of application of a drive source brake to the hybrid drive vehicle; (b) an electric generator driven by a kinetic energy of the hybrid drive vehicle to generate an electric energy and apply as the drive source brake a regenerative brake force corresponding to the generated electric energy to the vehicle; and (c) electricity generation control means for controlling the electric energy generated by the electric generator, depending upon the degree of application of the drive source brake selected by the manually operated means.

In the drive source brake control apparatus for the hybrid drive vehicle, the electricity or electric energy generated by the electric generator or dynamo is controlled depending upon the degree of the drive source brake application to the vehicle as selected by the vehicle operator through the manually operated means, and the regenerative brake force corresponding to the controlled generated electric energy is applied to the vehicle as the drive source brake. In the present apparatus, therefore, the regenerative brake force as the drive source brake force is controlled with a higher response to the operation of the manually operated means, than in the conventional apparatus in which the engine brake force as the drive source brake force is controlled by shifting the automatic transmission to one of its drive positions which corresponds to the selected degree of the engine brake application.

The principle of this first aspect of the invention is applicable to various types of hybrid drive vehicle wherein the drive power source includes an engine and a motor/generator, for example, a hybrid drive vehicle wherein the outputs of the engine and the electric motor are selectively transferred to the drive wheel by selective engagement and disengagement of clutches, a hybrid drive vehicle wherein the outputs of the engine and the electric motor are synthesized and distributed by a synthesizing/distributing mechanism such as a planetary gear device, and a hybrid drive vehicle wherein the electric motor is operated as an auxiliary drive power source. The hybrid drive vehicle may have an electric motor for each of a plurality of drive wheels.

The transmission may be either a manual transmission or an automatic transmission. The automatic transmission may be a planetary gear type transmission or a parallel two-axes type transmission, which has a plurality of forward drive positions having respective different speed ratios. However, the automatic transmission may be a continuously variable transmission of belt-and-pulley type or toroidal type whose speed ratio is continuously variable. For instance, the automatic transmission is disposed in a power transmitting path between the drive wheel and an assembly of the engine and the electric generator.

The electric generator may be disposed at a suitable position. The electric motor and the electric generator may be provided by a single motor/generator, which is selectively operated as the electric motor and the electric generator. Where the automatic transmission is disposed in a power transmitting path between the drive wheel and the assembly of the engine and the electric generator, it is desirable that the electric energy generated by the electric generator be controlled by the electricity generation control means while the automatic transmission is held in a predetermined position having a predetermined speed ratio.

Where an automatic transmission having a plurality of forward drive positions having respective different speed ratios is disposed in a power transmitting path between the drive wheel and the assembly of the engine and the electric generator, the manually operated means may comprise a shift lever having a forward drive position for permitting the automatic transmission to be shifted to any one of the forward drive positions. In this case, the shift lever further has a drive source brake position in which the shift lever is operable to designate a desired degree of the drive source brake application to the vehicle.

It is also desirable to provide suitable means for apply an engine brake to the vehicle or both of the engine brake and the regenerative brake to the vehicle, if the regenerative brake force corresponding to the degree of the drive source brake application selected by the manually operated means exceeds the maximum regenerative brake force that can be generated by the electric generator.

In one preferred form of the apparatus of the first aspect of the invention, the electric motor and the electric generator are provided by a single motor/generator which is selectively operated as the electric motor and the electric generator, and the apparatus further comprises: an electric energy storage device for storing the electric energy by which the electric motor is operated; a synthesizing/distributing mechanism having a first clutch, an output member, a first rotary element connected to the engine through the first clutch, a second rotary element connected to the motor/generator, and a third rotary element connected to the output member, the automatic transmission being disposed between the output member and the drive wheel; a second clutch for connecting two elements of the first, second and third rotary elements of the synthesizing/distributing mechanism; regenerative braking control means for releasing the first clutch while engaging the second clutch, for permitting the motor/generator to be driven as the electric generator by the kinetic energy of the vehicle to charge the electric energy storage device and apply the regenerative brake force to the vehicle; and engine braking control means for engaging the first and second clutches, while holding the motor/generator in a non-load state, for permitting the engine to be driven by the kinetic energy of the vehicle to apply an engine brake to the vehicle as the drive source brake.

The synthesizing/distributing mechanism indicated above may be a mechanism including a planetary gear device or differential gear device, which has three rotary elements operatively connected to each other and which is adapted to mechanically synthesize or distributing forces produced by the engine and the motor/generator. For instance, the synthesizing/distributing mechanism may be adapted such that the outputs of the engine and the motor/generator (electric motor) are transferred from the output member to the drive wheel, or the output of the engine is transferred to the motor/generator and the drive wheel so that the vehicle is driven by the engine while the electric generator is operated by the engine to charge the electric energy storage device. However, the synthesizing/distributing mechanism need not have both a force synthesizing function and a force distributing function. The engine braking control means may be adapted to hold the engine in an idling state or cut a fuel supply to the engine while the engine is operated by the kinetic energy of the vehicle.

The object indicated above may also be achieved according to a second aspect of the invention, which provides an apparatus for controlling a drive source brake force to be applied to a hybrid drive vehicle comprising a drive wheel, an electric energy storage device for storing an electric energy, a drive power source for driving the drive wheel, and an automatic transmission whose speed ratio is variable, the drive power source including an engine operated by combustion of a fuel and an electric motor operated with the electric energy supplied from the electric energy storage device, and the automatic transmission being disposed in a power transmitting path between the engine and the drive wheel, the apparatus comprising: (a) manually operated means for selecting one of a plurality of different degrees of application of a drive source brake to the hybrid drive vehicle; (b) an electric generator driven by a kinetic energy of the hybrid drive vehicle to generate an electric energy and apply as the drive source brake a regenerative brake force corresponding to the generated electric energy to the vehicle; (c) engine brake shift control means for shifting the automatic transmission so as to change the speed ratio thereof depending upon the degree of application of the drive source brake selected by the manually operated means, so that an engine brake force which is produced by operation of the engine by the kinetic energy of the hybrid drive vehicle and which is applied to the hybrid drive vehicle is controlled depending upon the speed ratio of the automatic transmission; (d) electricity generation control means for controlling the electric energy generated by the electric generator, depending upon the degree of application of the drive source brake selected by the manually operated means; and (e) drive source brake selecting means for selectively enabling the engine brake shift control means and the electricity generation control means to be operated, depending upon an amount of the electric energy stored in the electric energy storage device.

In the drive source brake force control apparatus according to the second aspect of this invention, the regenerative brake generated by the electric generator and the engine brake generated by the engine are selectively applied to the hybrid drive vehicle, depending upon the amount of the electric energy stored in the electric energy storage device. Where the electric energy storage device is excessively charged, the electric generator cannot be operated to charge the storage device, namely, the regenerative brake cannot be applied to the vehicle as the drive source brake. In this case, the engine brake can be applied to the vehicle as the drive source brake. Further, the electricity generation control means may be adapted to control the electric energy generated by the electric generator, that is, the regenerative brake force generated by the electric generator, depending upon the selected degree of the drive source brake application, so that the regenerative brake force is substantially equal to the engine brake force as controlled by the engine brake shift control means. Accordingly, the present apparatus assures substantially the same drive source brake force irrespective of whether the regenerative brake or the engine brake is applied to the vehicle as the drive source brake. In other words, the present apparatus is less likely to suffer from a difference in the drive source brake force due to the selective application of the regenerative brake and the engine brake, which difference would be undesirable to the operator who does not generally distinguish the regenerative brake and the engine brake from each other.

The drive source brake selecting means is preferably adapted to enable the engine brake shift control means when the amount of the electric energy stored in the storage device is larger than a predetermined upper limit (above which the storage device cannot be charged), and enable the electricity generation control means when the electric energy amount stored in the storage device is not larger than the upper limit. In the former case, the engine brake is applied to the vehicle. In the latter case, the regenerative brake is applied to the vehicle. The upper limit indicated above is suitably determined so as to prevent considerable deterioration of the charging and discharging efficiencies of the electric energy storage device or damage of the storage device due to a change in the stored electric energy amount.

When the vehicle is running at a relatively high speed, the regenerative braking torque generated by the electric generator may not permit a regenerative brake force almost equal to the engine brake force. In this case, the engine brake may be added to increase the overall drive source brake force, or the regenerative brake may be replaced by the engine brake, which may be controlled by controlling the opening angle of the throttle valve and the amount of fuel injection.

The automatic transmission may be a transmission which has a plurality of different speed ratios or whose speed ratio is continuously variable, as described above with respect to the first aspect of the invention. The manually operated means may comprise a shift lever arranged as also described above with respect to the first aspect of the invention.

The apparatus according to the second aspect of the invention may also comprise a synthesizing/distributing mechanism, a second clutch, regenerative braking control means and engine braking control means, which have been described above with respect to the first aspect of the invention.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which:

FIG. 5 is a view indicating nine operation modes of the hybrid drive motor vehicle, which are selectively established in the sub-routine of FIG. 4;

DETAILED DESCRIPTION OF THE PREFERRED EMBODIMENT

Figure 1:
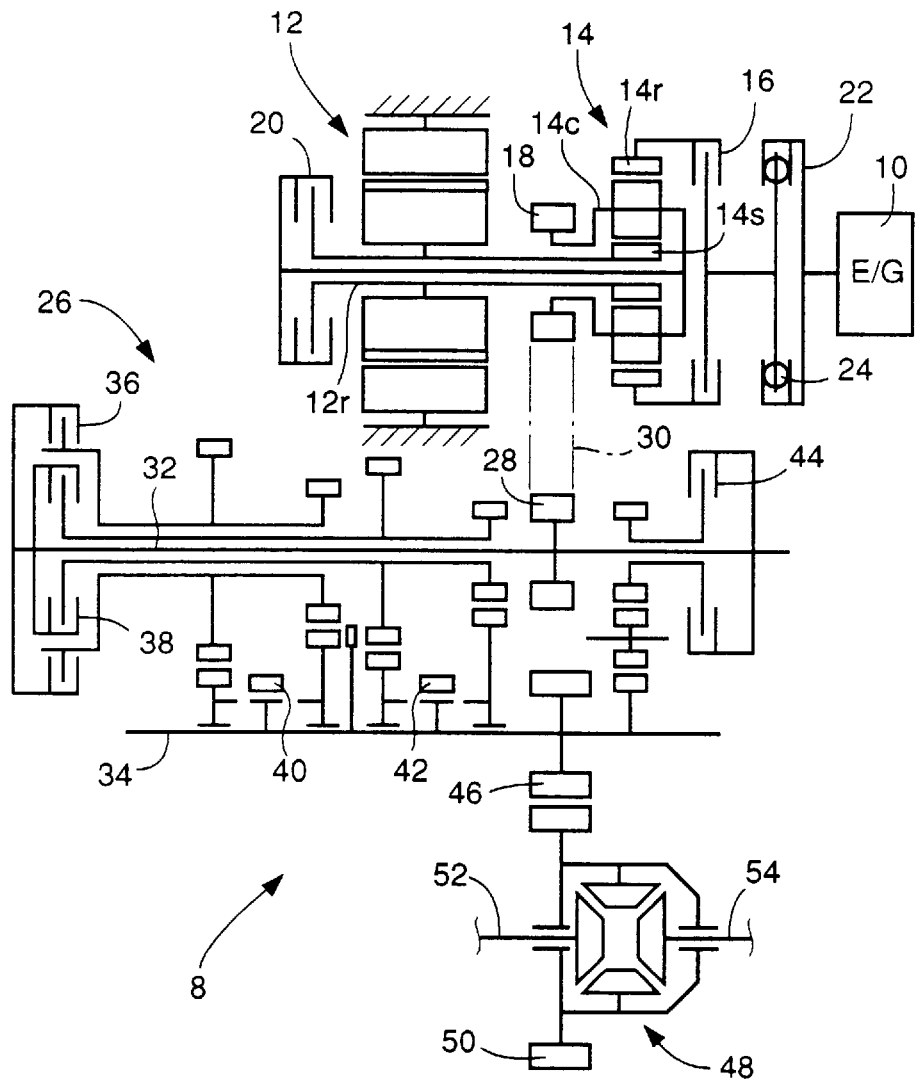
FIG. 1 is a schematic view illustrating a general arrangement of a drive system of a hybrid drive motor vehicle equipped with a drive source brake control apparatus constructed according to one embodiment of this invention.

Referring first to the schematic view of FIG. 1, there is shown a hybrid drive system 8 for a front-engine front-drive hybrid drive motor vehicle. The present hybrid drive system 8 is installed on the motor vehicle such that various axes of the hybrid drive system 8 are substantially parallel to the transverse or lateral direction (width direction) of the motor vehicle. The hybrid drive system 8 includes an engine 10 such as an internal combustion engine operated by combustion of a fuel, a motor/generator 12 functioning as an electric motor and an electric generator, and a planetary gear device 14 of single pinion type. The planetary gear device 14 functions as a synthesizing/distributing mechanism for mechanically synthesizing and distributing a force. The planetary gear device 14 includes a first rotary element in the form of a ring gear 14r connected to the engine 10 through a first clutch 16, a second rotary element in the form of a sun gear 14s connected to a rotor shaft 12r of the motor/generator 12, and a third rotary element in the form of a carrier 14c which has an integrally formed driving sprocket 18 functioning as an output member. The sun gear 14s and the carrier 14c are connected to each other by a second clutch 20. An output of the engine 10 is transferred to the first clutch 16 through a flywheel 22 and a damper 24. The flywheel 22 serves to reduce speed and torque variations of the engine 10. The damper 24 includes a suitable elastic member such as a spring or a rubber member. The first and second clutches 16, 20 are friction type multiple-disk clutches, each of which is operated between engaged and released states thereof by a hydraulic actuator.

The driving sprocket 18 is connected through a chain 30 to a driven sprocket 29 which functions as an input member of an automatic transmission 26. The automatic transmission 26 is a parallel two-axes type transmission having a first or input shaft 32 on which the driven sprocket 28 is provided, and a second or output shaft 34 parallel to the first shaft 32. The automatic transmission 26 has four pairs of mutually meshing gears for forward driving of the vehicle, and a pair of gears connected through an idler gear for reverse running of the vehicle. The automatic transmission 26 includes two frictionally coupling clutches 36, 38 operated by respective hydraulic actuators, and two positive or claw clutches 40, 42 operated by respective hydraulic actuators. With these clutches 36, 38, 40, 42 selectively placed in their engaged and released positions, the automatic transmission 26 is selectively placed in one of a neutral position and four forward-drive positions. The automatic transmission 26 further includes a frictionally coupling clutch 44 operated by a hydraulic actuator for establishing a reverse-drive position. The second or output shaft 34 has an output gear 46 mounted thereon, which meshes with a ring gear 50 of a bevel gear type differential gear device 48. The ring gear 50 functions as an input member of the differential gear device 48. Power transferred to the output gear 46 is distributed to right and left drive wheels (front wheels) of the vehicle through a pair of output shafts 52, 54 of the differential gear device 48. In FIG. 1, a portion corresponding to the lower half of the second shaft 34 is not shown except for the output gear 46, since the assembly including the second shaft 34 is symmetrical with respect to the axis of the second shaft 34.

Figure 2:
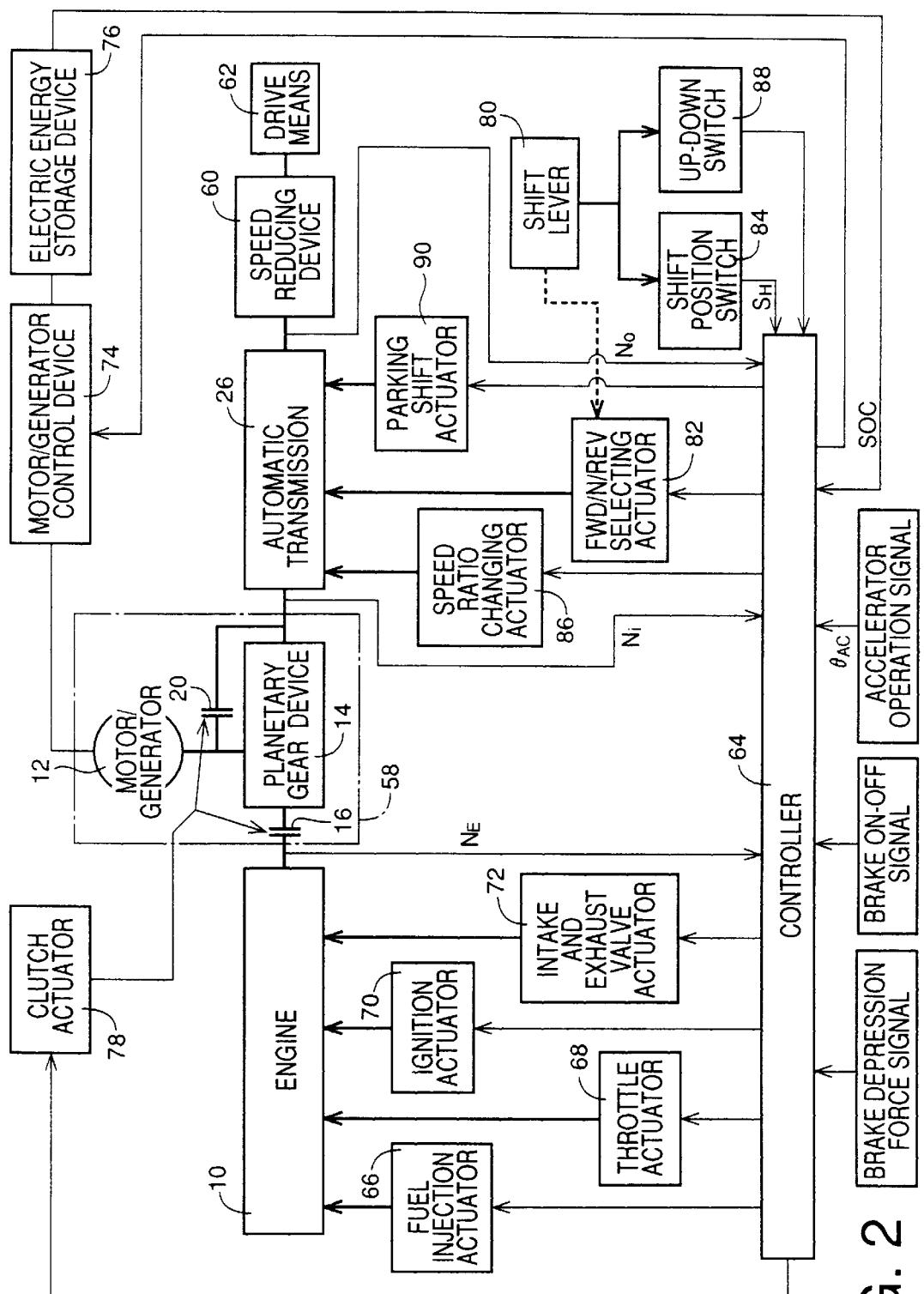
FIG. 2 is a block diagram of a control system of the hybrid drive motor vehicle of FIG. 1.
Figure 3:
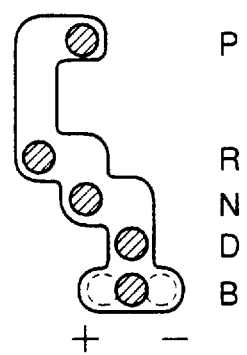
FIG. 3 is a view for explaining operating positions of a shift lever provided on the hybrid drive vehicle of FIG. 1.

Referring next to the block diagram of FIG. 2, there is shown a control system for the hybrid vehicle drive system 8. In FIG. 3, thick solid lines indicate mechanical connections, while thin solid lines indicate electric connections. The motor/generator 12, planetary gear mechanism 14 and first and second clutches 16, 20 cooperate to constitute an electrically controlled torque converter 58. The differential gear device 48 constitutes a major portion of a speed reducing device 60 shown in FIG. 2, and the front drive wheels constitute a major portion of drive means 62 also shown in FIG. 2.

The operating states of the engine 10 are controlled by a fuel injection actuator 66, a throttle actuator 68, an ignition actuator 70, and an intake and exhaust valve actuator 72. These actuators 66, 68, 70, 72 are controlled by a controller 64, to control the engine 10. The motor/generator 12 is connected to an electric energy storage device 76 such as a battery or capacitor through a motor/generator control device 74 such as an inverter. The motor/generator control device 74 is controlled by the controller 64, so that the motor/generator 12 is placed in one of a DRIVE state, a CHARGING state, and a NON-LOAD or FREE state. In the DRIVE state, the motor/generator 12 is operated as an electric motor to provide a predetermined torque for driving the vehicle, with an electric energy being supplied to the electric motor from the electric energy storage device 74. In the CHARGING state, the motor/generator 12 is operated as an electric generator or dynamo, by regenerative braking (i.e., electrical braking torque of the motor/generator 12 per se), so as to charge the electric energy storage device 76 with an electric energy. In the NON-LOAD or FREE state, the motor/generator 12 is placed in a non-load condition permitting free rotation of the rotor shaft 12*r*. The hydraulic actuators for the first and second clutches 16, 20 are controlled by the controller 64 through respective solenoid-operated valves, so that these clutches 16, 20 are selectively placed in their engaged and released states, for selective connection and disconnection between the engine 10 and the ring gear 14*r*, and between the sun gear 14*s* and the carrier 14*c*.

The automatic transmission 26 has a parking position, a neutral position "N", a rear drive position "REV", and a plurality of forward drive positions "FWD", namely, first-speed, second-speed, third-speed and fourth-speed positions "1st", "2nd", "3rd" and "4th". The neutral position "N", rear drive position "REV" and forward drive positions "FWD" are selectively established by a FWD/N/REV selecting actuator 82 under the control of the controller 64, through a hydraulic circuit including a manual shift valve which is mechanically connected to a shift lever 80. As indicated in FIG. 3, the shift lever 80 has a total of five operating positions, parking position "P", reverse position "R", neutral position "N", forward drive position "D", and drive source brake position "B". With the shift lever 80 placed in the neutral position "N", the automatic transmission 26 is shifted to the neutral position "N". With the shift lever 80 placed in the reverse position "R", the automatic transmission 26 is shifted to the rear drive position "REV". The currently selected position $S_H$ of the shift lever 80 is detected by a shift position switch 84. Namely, the output signal of the shift position switch 84 represents the selected position $S_H$ of the shift lever 80. When the shift lever 80 is placed in the forward drive position, the automatic transmission 26 is automatically shifted to any one of the forward drive positions by a speed ratio changing actuator 86 under the control of the controller 64. The speed ratio changing actuators 76 include solenoid-operated valves for establishing a selected one of combinations of the engaged and released states of the hydraulically operated frictionally coupling clutches 36, 38 and positive clutches 40, 42. Described more specifically, one of the forward drive positions "1st", "2nd", "3rd" and "4th" is selected on the basis of the operating amount $\theta_{AC}$ of an accelerator pedal and a running speed V of the vehicle, and according to predetermined shift patterns which are relationships between these parameters $\theta_{AC}$ and V. With the shift lever 80 placed in the parking position "P", the automatic transmission 26 is shifted to the parking position by a parking shift actuator 90. In the parking position, a parking brake is applied to the wheels of the vehicle.

As indicated in FIG. 3, the drive source brake position "B" of the shift lever 80 is adjacent to the forward drive position "D". When the shift lever 80 is placed in the drive source brake position "B", the shift lever 80 may be inclined in a direction perpendicular to the shifting direction in which the positions "P", "R", "N", "D" and "B" are selected. That is, the shift lever 80 placed in the drive source brake position "B" may be inclined to right and left positions indicated by circles of broken lines in FIG. 3. The movements of the shift lever 80 to these right and left positions in the drive source brake position "B" are detected by an UP-DOWN switch 88, an output signal of which is sent to the controller 64 each time the shift lever 80 is inclined to the right or left position in the drive source brake position "B". It will be understood that the shift lever 80 functions as manually operated means for selecting one of a plurality of different degrees of drive source brake application to the motor vehicle.

Figure 4:
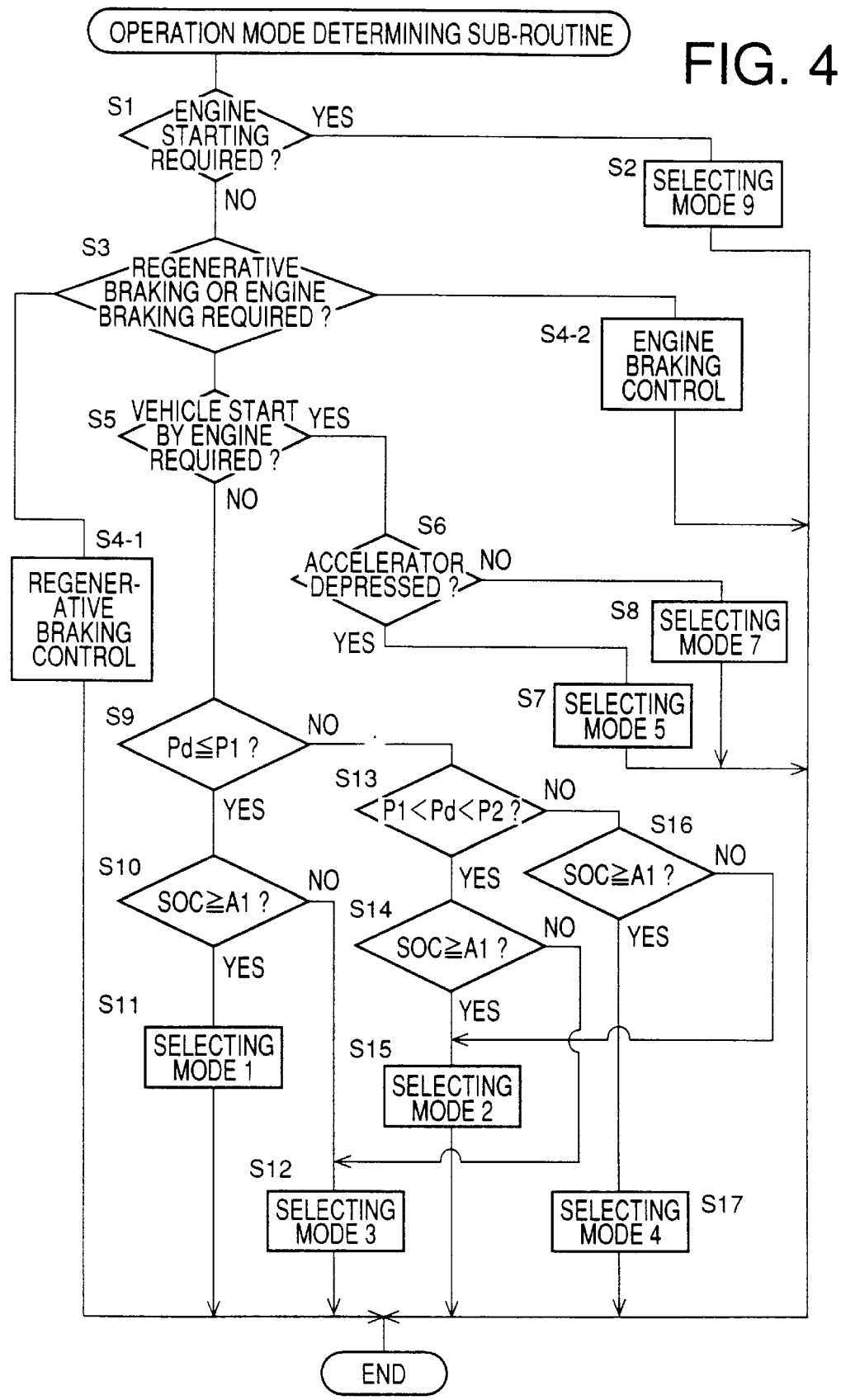
FIG. 4 is a flow chart illustrating an operation mode determining sub-routine executed by the control system of FIG. 2.

The controller 64 includes a microcomputer incorporating a central processing unit (CPU), a random-access memory (RAM), and a read-only memory (ROM), and is adapted to control the hybrid drive system 8 according to a predetermined control program, more specifically, select one of nine operation modes indicated in FIG. 5, according to an operation mode determining sub-routine illustrated in the flow chart of FIG. 4 by way of example, and operate the hybrid drive system 8 in the selected operation mode. The controller 64 receives various signals from various detectors, such as signals indicative of: torque $T_E$ and speed $N_E$ of the engine 10; torque $T_M$ and speed $N_M$ of the motor/generator 12; input shaft speed Ni of the automatic transmission 26; output shaft speed No of the automatic transmission 26 (which speed No can be used to calculate the running speed V of the vehicle); operating amount $\theta_{AC}$ of the accelerator pedal; amount SOC of electric energy stored in the electric energy storage device 76; operating state of a brake system (operating state of a brake pedal); currently selected position $S_H$ of the shift lever 80; and operator's desired degree of drive source brake application as obtained from the output signals of the UP-DOWN switch 88. The engine torque $T_E$ can be obtained from the opening angle of the throttle valve or fuel injection amount, while the motor torque $T_M$ can be obtained from the electric current of the electric motor 12 when the motor/generator is operated as the electric motor. The stored electric energy amount SOC can be obtained from the electric current or charging efficiency of the electric generator 12 when the motor/generator is operated as the electric generator to charge the storage device 76.

The operation mode determining sub-routine of FIG. 4 is initiated with step S1 to determine whether there exists a command requiring the engine 10 to be started for driving the vehicle with the engine 10 used as the drive power source or for operating the motor/generator 12 for charging the electric energy storage device 76. If an affirmative decision (YES) is obtained in step S1, the control flow goes to step S2 to select an operation mode 9. In this operation mode 9, the first and second clutches 16 and 20 are both engaged (turned ON) as indicated in FIG. 5, and the motor/generator 12 is operated to start the engine 10 through the planetary gear device 14, with the fuel injection amount and other conditions of the engine 10 being suitably controlled. When this operation mode 9 is selected while the vehicle is stationary, the starting of the engine 10 is effected with the automatic transmission 26 placed in the neutral position. When the operation mode 9 is selected during running of the vehicle with only the motor/generator 12 as the drive power source as in an operation mode 1 in which the first clutch 16 is in the released state, the first clutch 16 is engaged, and the motor/generator 12 is operated so as to provide an output which is larger than the output necessary to drive the vehicle, by a given surplus output of the motor/generator 12. Thus, even when the vehicle is running, the engine 10 can be started in the operation mode 9 by temporarily placing the automatic transmission 26 in the neutral position. The operation mode 9 eliminates an exclusive starter such as an electric motor provided for the sole purpose of starting the engine, and is therefore effective to reduce the required number of components of the hybrid drive system 8, leading to an accordingly reduced cost of manufacture thereof.

Figure 6:
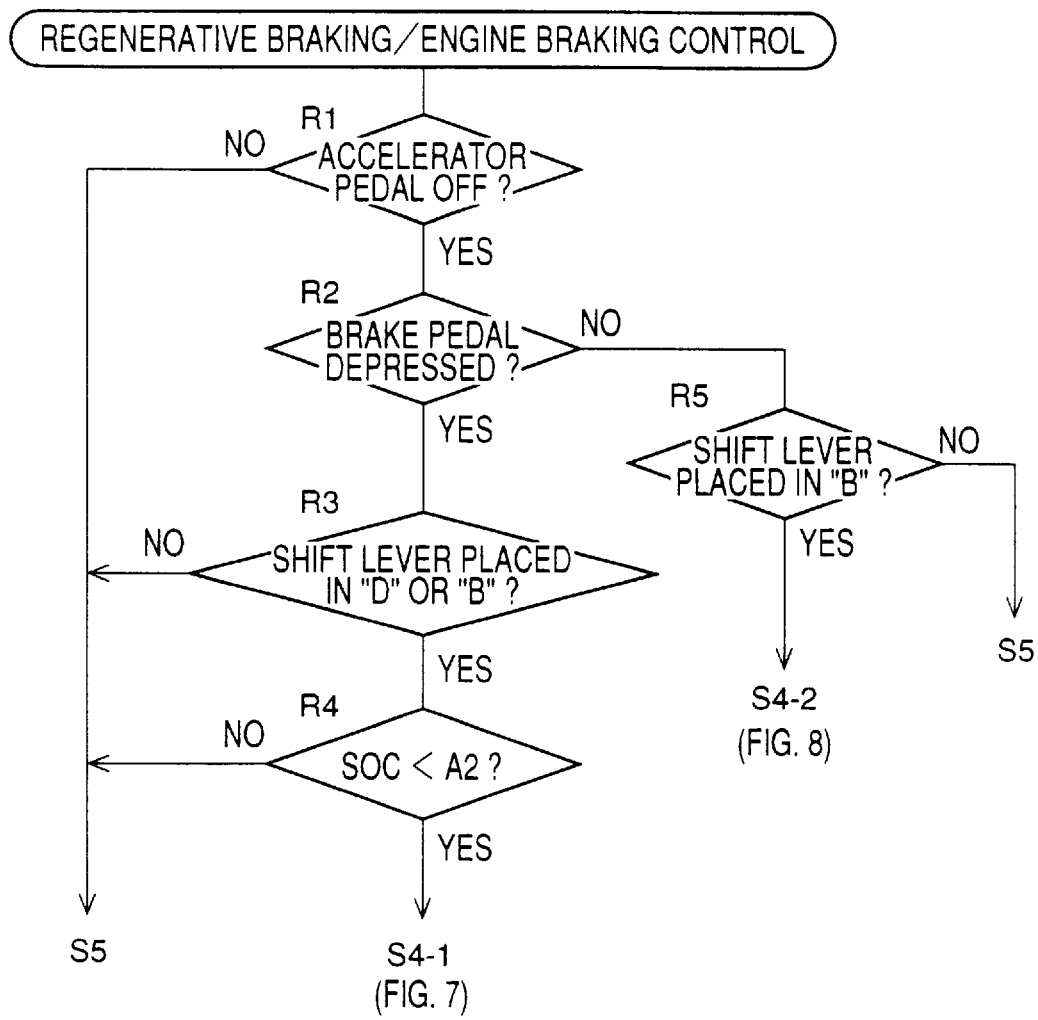
FIG. 6 is a flow chart showing in detail the content of step S3 of the sub-routine of FIG. 4.

If a negative decision (NO) is obtained in step S1, that is, no command requiring the starting of the engine 10 is present, the control flow goes to step S3 to determine whether the application of regenerative braking or engine braking to the vehicle is required. This step S3 is implemented as illustrated in the flow chart of FIG. 6. Initially, step R1 is implemented to determine whether the accelerator pedal is not depressed, that is, whether the operating amount $\theta_{AC}$ is smaller than a predetermined threshold which is substantially zero. If the accelerator pedal is off, the control flow goes to step R2. If the accelerator pedal is depressed, the control flow goes to step S5 of the sub-routine of FIG. 4. Step R2 is provided to determine whether the brake pedal is depressed. This determination may be made on the basis of an output signal of a brake switch provided to detect an operation of the brake pedal. If an affirmative decision (YES) is obtained in step R2, the control flow goes to step R3. If a negative decision (NO) is obtained in step R2, step R5 is implemented to determine whether the currently selected position $S_H$ of the shift lever 80 is the drive source brake position "B". If the shift lever 80 is placed in the engine braking position "B", the control flow goes to step S4-2 of the sub-routine of FIG. 4, to effect drive source brake control. If the shift lever 80 is not placed in the drive source brake position "B", the control flow goes to step S5 of FIG. 4.

Step R3 which is implemented when the brake pedal is depressed is provided to determine whether the currently selected position $S_H$ of the shift lever 80 is either the forward drive position "D" or the drive source brake position "B". If a negative decision (NO) is obtained in step R3, the control flow goes to step S5 of FIG. 4. If an affirmative decision (YES) is obtained in step R3, that is, if the shift lever 80 is currently placed in the forward drive position "D" or drive source brake position "B", the control flow goes to step R4 to determine whether the electric energy amount SOC stored in the electric energy storage device 76 is smaller than a predetermined upper limit A2. If an affirmative decision (YES) is obtained in step R4, the control flow goes to step S4-1 of FIG. 4, to effect regenerative braking control. If a negative decision (NO) is obtained in step R4, the control flow goes to step S5 of FIG. 4. The upper limit A2 is a maximum amount of the electric energy currently stored in the storage device 76, below which the storage device 76 is permitted to be charged by the electric generator 12. This upper limit A2 is determined by the charging and discharging efficiencies of the storage device 76. For example, the upper limit A2 is selected to be about 80% of the full capacity of the storage device 76.

Figure 7:
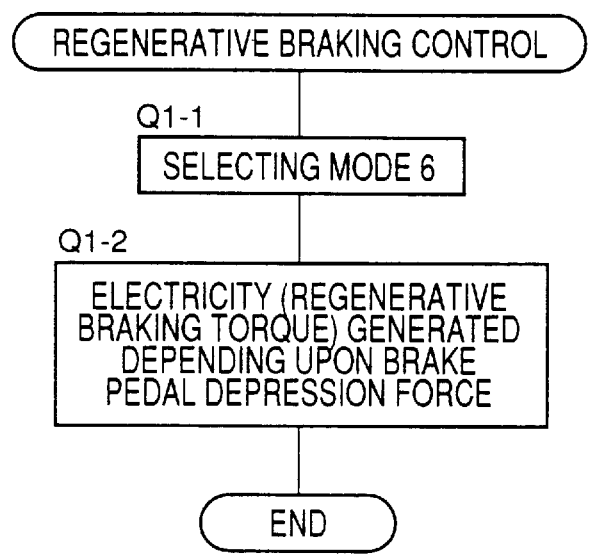
FIG. 7 is a flow chart showing in detail the content of step S4-1 of the sub-routine of FIG. 4.

The regenerative braking control in step S4-1 is effected as illustrated in the flow chart of FIG. 7. Initially, step Q1-1 is implemented to select an operation mode 6. Step Q1-1 is followed by step Q1-2 in which the electric energy generated by the electric generator 12 is controlled depending upon the depression force acting on the brake pedal. In the operation mode 6, the first clutch 16 is released (turned OFF) and the second clutch 20 is engaged (turned ON), while the engine 10 is turned OFF, and the motor/generator 12 is placed in the CHARGING state, as indicated in FIG. 5, whereby the motor/generator 12 is operated as the electric generator by a kinetic energy of the motor vehicle, so as to charge the electric energy storage device 76 while applying a regenerative brake to the motor vehicle. Like the engine braking, the regenerative braking reduces the required amount of operation of the brake pedal by the vehicle operator, and facilitates the control of the vehicle running. Since the engine 10 is disconnected from the planetary gear device 14 with the first clutch 16 placed in the released state, the energy loss of the vehicle due to the drag resistance of the engine 10 is prevented in the operation mode 6. Further, since the operation mode 6 is selected when the stored electric energy amount SOC is smaller than the upper limit A2, the electric energy storage device 76 is protected from excessive charging and resulting deterioration of its charging and discharging efficiencies. In the regenerative braking control in step Q1-2, the motor/generator controller 74 is controlled to control the electric generator 12 so that the electric energy generated by the electric generator 12 increases with an increase in the depression force acting on the brake pedal. In this arrangement, the regenerative braking torque corresponding to the generated electric energy increases with the brake pedal depression force. The regenerative brake force based on the regenerative braking torque is applied to the motor vehicle. In the present application, a brake based on this regenerative brake force in the regenerative braking mode as well as an engine brake in the engine braking mode is considered to be a "drive source brake" applied to the vehicle.

Figure 8:
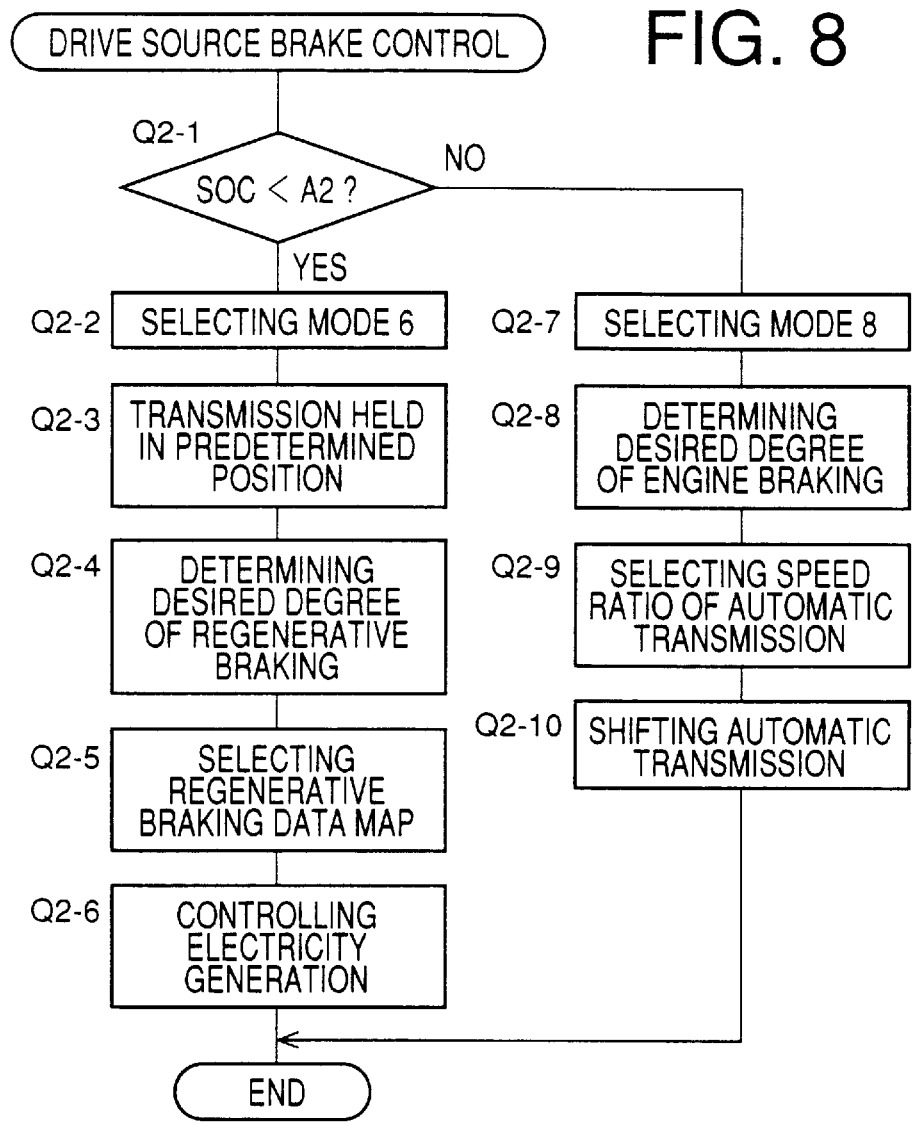
FIG. 8 is a flow chart showing in detail the content of step S4-2 of the sub-routine of FIG. 4.
Figure 9A:
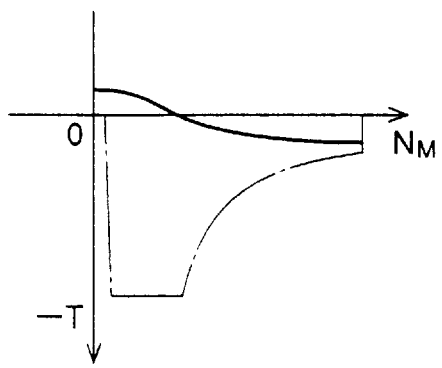
FIGS. 9A–9D are views for explaining regenerative braking data maps selectively used in step Q2-5 of the flow chart of FIG. 8.
Figure 9B:
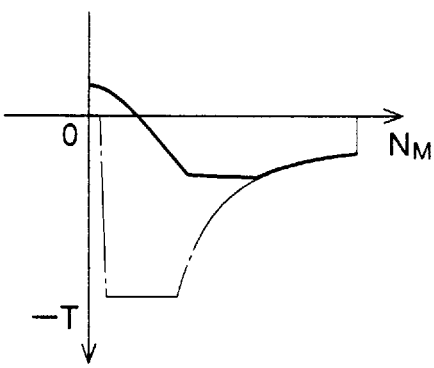
Figure 9C:
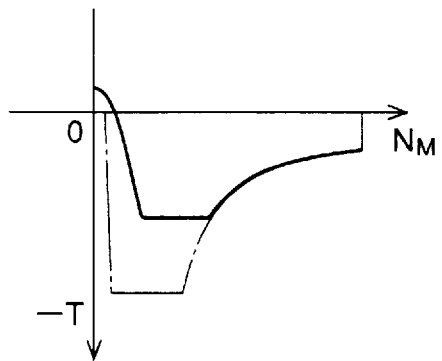
Figure 9D:
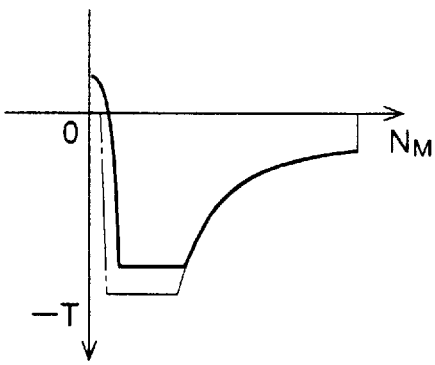

The drive source brake control in step S4-2 of FIG. 4 is effected as illustrated in the flow chart of FIG. 8. Initially, step Q2-1 is implemented to determine whether the electric energy amount SOC currently stored in the storage device 76 is smaller than the upper limit A2. If an affirmative decision (YES) is obtained in step Q2-1, it means that the storage device 76 can be charged. In this case, step Q2-2 and the following steps are implemented to control the electricity generation by the electric generator 12 for applying a regenerative brake to the vehicle. If a negative decision (NO) is obtained in step Q2-1, the control flow goes to step Q2-7 and the following steps to apply an engine brake to the vehicle. It will be understood that a portion of the controller 64 assigned to implement step Q2-1 serves as drive source brake selecting means for selecting the regenerative braking mode (operation mode 6) or the engine braking mode (operation mode 8), depending upon the electric energy amount SOC stored in the storage device 76.

Step Q2-2 is implemented to select the operation mode 6 (regenerative braking mode) as in step Q1-1. Step Q2-2 is followed by step Q2-3 in which the automatic transmission 26 is held in a predetermined position, for example, the third-speed position "3rd" or the position whose speed ratio is next higher than the position selected with the shift lever 80 placed in the forward drive position "D". In the third-speed position "3rd", the power loss is relatively small, and the electric generator 12 is suitably driven by the kinetic energy of the vehicle. Step Q2-3 is followed by step Q2-4 to determine the desired degree of regenerative brake application to the vehicle, on the basis of the output signals of the UP-DOWN switch 88, namely, the operations of the shift lever 80 to the right and left (positive and negative) positions when the shift lever 80 is placed in the drive source brake position "B". Then, the control flow goes to step Q2-5 to select one of regenerative braking data maps which corresponds to the determined degree of regenerative brake application. Each regenerative braking data map is a relationship between the regenerative braking torque and the speed $N_M$ of the motor/generator 12. In the next step Q2-6, the electric current of the electric generator 12 is controlled on the basis of the speed $N_M$ and according to the selected regenerative braking data map, so that the electric generator 12 provides the regenerative braking torque corresponding to the speed $N_M$.

In the present embodiment wherein the automatic transmission 26 have the four forward drive positions, four regenerative braking data maps are provided as indicated in FIGS. 9A, 9B, 9C and 9D, which correspond to the four forward drive positions of the automatic transmission 26. These data maps are formulated so that the electric generator 12 provides the regenerative brake force which is substantially the same as the engine brake force provided by the engine 10. The data map Map 1 of FIG. 9A corresponds to the fourth-speed position "4th" whose speed ratio is the smallest, while the data map Map 2 of FIG. 9B corresponds to the third-speed position "3rd" whose speed ratio is the next smallest. The data Map 3 of FIG. 9C corresponds to the second-speed position "2nd" whose speed ratio is the second largest, while the data map Map 4 of FIG. 9D corresponds to the first-speed position "1st" whose speed ratio is the largest. Where the automatic transmission 26 is held in the third-speed position "3rd" in step Q2-3, the data map Map 4 corresponding to the first-speed position "1st" is selected when the shift lever 80 in the drive source brake position "B" has been operated to the right or negative (minus "−") position two times. If the shift lever 80 in the drive source brake position "B" is then operated once to the left or positive (plus "+") position, the data map Map 3 corresponding to the second-speed position "2nd" is selected. The four regenerative braking data maps shown in FIGS. 9A–9D are formulated on the assumption that the automatic transmission 26 is held in the third-speed position "3rd" in step Q2-3. The data maps are stored in the ROM of the controller 64. One-dot chain lines in FIGS. 9A–9D represent the maximum regenerative braking torque.

It will be understood that a portion of the controller 64 assigned to implement step Q2-2 for selecting the regenerative braking mode (operation mode 6) serves as regenerative braking control means for permitting the motor/generator to be driven as the electric generator by a kinetic energy of the vehicle to charge the electric energy storage device 76 and apply the regenerative brake to the vehicle. It will also be understood that a portion of the controller 64 assigned to implement steps Q2-4, Q2-5 and Q2-6 serves as electricity generation control means for controlling the electric energy generated by the electric generator, depending upon the degree of application of the drive source brake selected by the shift lever 88.

Step Q2-7 which is implemented if the negative decision (NO) is obtained in step Q2-1 is provided to select an operation mode 8 (engine braking mode). In the operation mode 8, the first and second clutches 16, 20 are both engaged (turned ON), as indicated in FIG. 5, and the motor/generator 12 is placed in the NON-LOAD state. Further, the engine 10 is turned OFF, that is, the throttle valve is closed and the fuel injection amount is zeroed. As a result, an engine brake due to the drag resistance of the engine 10 is applied to the vehicle, whereby the required amount of operation of the brake pedal by the vehicle operator is reduced, facilitating the control of the vehicle running. Since the motor/generator 12 is placed in the NON-LOAD state and permitted to rotate freely in the operation mode 8, the electric energy storage device 76 is protected from excessive charging and resulting deterioration of its charging and discharging efficiencies.

It will be understood that a portion of the controller 64 assigned to implement step Q2-7 for selecting the engine braking mode (Operation mode 8) serves as engine braking control means for permitting the engine to be driven by a kinetic energy of the vehicle to apply an engine brake to the vehicle as the drive source brake.

Step Q2-7 is followed by step Q2-8 to determine the desired degree of engine brake application to the vehicle, on the basis of the output signals of the UP-DOWN switch 88, as in step Q2-4. Then, the control flow goes to step Q2-8 to select one of the forward drive positions of the automatic transmission 26 which corresponds to the determined degree of engine braking. Step Q2-9 is followed by step Q2-10 in which the automatic transmission 26 is shifted to the selected forward drive position. The brake force produced by the engine 10 increases with an increase in the speed $N_E$ of the engine 10, namely, with an increase in the speed ratio of the automatic transmission 26. Therefore, since the position to which the automatic transmission 26 is shifted in step Q2-9 is selected depending upon the degree of engine braking desired by the vehicle operator, the engine brake force desired by the vehicle operator can be obtained in the engine braking mode.

It will be understood that a portion of the controller 64 assigned to implement steps Q2-8, Q2-9 and Q2-10 serves as engine brake shift control means for shifting the automatic transmission 26 so as to change the speed ratio thereof depending upon the degree of application of the drive source brake selected by the shift lever (88), so that an engine brake force which is produced by operation of the engine by the kinetic energy and which is applied to the vehicle is controlled depending upon the currently established speed ratio of the automatic transmission.

Referring back to the operation mode determining subroutine of FIG. 4, step S5 is implemented if neither the regenerative braking nor the engine braking is required. Step S5 is provided to determine whether the vehicle is required to be started by operation of the engine 10. This determination may be effected by determining whether the vehicle is in a temporary stop during running of the vehicle with the engine 10 used as the drive power source as in an operation mode 3 (which will be described). For instance, the temporary stopping of the vehicle can be detected by checking if the output speed No of the automatic transmission 26 is zero. Namely, the output speed No is zero when the vehicle is stationary. If an affirmative decision (YES) is obtained in step S5, the control flow goes to step S6 to determine whether the accelerator pedal is in a depressed state, more specifically, whether the operation amount $\theta_{AC}$ of the accelerator pedal is larger than a predetermined lower limit which is close to zero but larger than zero. If an affirmative decision (YES) is obtained in step S6, the control flow goes to step S7 to select an operation mode 5. If a negative decision (NO) is obtained in step S6, the control flow goes to step S8 to select an operation mode 7.

In the operation mode 5 selected in step S7, the first clutch 16 is engaged (turned ON) and the second clutch 20 is released (turned OFF), and the engine 10 is operated, as indicated in FIG. 5, whereby the vehicle is started by the engine 10, with the regenerative braking torque of the motor/generator 12 being suitably controlled. Described in detail, the ratios of the engine torque $T_E$, output torque of the planetary gear device 14 and motor torque $T_M$ are 1: (1+ρ) : ρ, where ρ represents a gear ratio of the planetary gear device 14 (ρ=the number of teeth of the sun gear 14s divided by the number of teeth of the ring gear 14r). When the gear ratio ρ is about 0.5 (as in a common planetary gear device), for example, the torque of the motor/generator 12 is controlled to be equal to a half of the engine torque $T_E$, so that the torque about 1.5 times the engine torque $T_E$ is produced from the carrier 14c of the planetary gear device 14. In other words, the vehicle is started with a torque as large as (1+ρ)/ρ times the torque of the motor/generator 12. If the motor/generator 12 is held in the NON-LOAD state with no current applied to the motor, the output of the carrier 14c is zeroed with the rotor shaft 12r merely rotating in the reverse direction, whereby the vehicle is held stationary. In this case, the planetary gear device 14 functions as a vehicle start clutch and a torque booster. With the motor torque $T_M$ (regenerative braking torque) gradually increased from zero to increase a reaction force of the motor/generator 12, the vehicle can be smoothly started with the output torque which is (1+ρ) times the engine torque $T_E$.

The motor/generator 12 used in the present hybrid drive system 8 has a torque capacity which is about ρ times the maximum torque of the engine 10. Namely, the torque capacity and size of the motor/generator 12 are minimized to minimize the size and cost of manufacture of the hybrid drive system 8, while assuring the required torque. The present hybrid drive system 8 is further adapted so that the opening angle of the throttle valve and the fuel injection amount are increased with an increase in the motor torque $T_M$, for preventing stalling of the engine 10 due to a drop of the engine speed $N_E$ due to an increase in the reaction force of the motor/generator 12.

In the operation mode 7 selected in step S8, the first clutch 16 is engaged (turned ON) and the second clutch 20 is released (turned OFF), and the engine 10 is operated while the motor/generator 12 is placed in the NON-LOAD state so that the hybrid drive system 8 is placed in an electrically neutral state, as indicated in FIG. 5. In this operation mode 7, the output of the carrier 14c is zeroed with the rotor shaft 12r of the motor/generator 12 rotating freely in the reverse direction. When this operation mode 6 is established during running of the vehicle with the engine 10 as the drive power source as in the operation mode 3, the stopping of the vehicle does not require the engine 10 to be turned OFF, and the vehicle can be started by the engine 10 as in the operation mode 5.

If a negative decision (NO) is obtained in step S5, that is, if the starting of the vehicle by the engine 10 is not required, the control flow goes to step S9 to determine whether a currently required output Pd of the hybrid drive system 8 is equal to or smaller than a predetermined first threshold P1. The currently required output Pd is an output of the hybrid drive system 8 required to drive the vehicle against a running resistance. This currently required output Pd is calculated according to a predetermined data map or equation, on the basis of the operating amount $\theta_{AC}$ of the accelerator pedal, a rate of change of this value $\theta_{AC}$, or the currently established operating position of the automatic transmission 26. The predetermined first threshold P1 is a boundary value of the output above which the vehicle is driven with only the engine 10 used as the drive power source and below which the vehicle is driven with only the motor/generator 12 as the drive power source. In other words, the vehicle is considered to be in a medium-load or high-load running state if the currently required output Pd is larger than the first threshold value P1, and in a low-load running state if the currently required output Pd is equal to or smaller than the first threshold value P1. For example, the first threshold value P1 is determined by experiments, so as to minimize the exhaust gas emissions and the fuel consumption, depending upon the energy efficiency during running of the vehicle (in which the electric energy storage device 75 may be charged by operation of the engine 10). If the currently required output Pd is equal to or smaller than the first threshold value Pd, the control flow goes to step S10 to determine whether the stored electric energy amount SOC is equal to or smaller than a predetermined lower limit A1. If an affirmative decision (YES) is obtained in step S10, the control flow goes to step S11 to select an operation mode 1. If a negative decision (NO) is obtained in step S10, the control flow goes to step S12 to select an operation mode 3. The lower limit A1 is a lower limit of the stored electric energy amount SOC above which the electric energy stored in the storage device 76 can be used to operate the motor/generator 12 as the drive power source. The lower limit A1 is determined depending upon the charging and discharging efficiencies of the storage device 76. For instance, the lower limit A1 is about 70% of the full capacity of the storage device 76.

In the operation mode 1 selected in step S11, the first clutch 16 is released (turned OFF) and the second clutch 20 is engaged (turned ON), and the engine 10 is turned OFF, while the motor/generator 12 is operated so as to provide the currently required output Pd, as indicated in FIG. 5, so that the vehicle is driven with only the motor/generator 12 used as the drive power source. In this operation mode 1, too, the engine 10 is disconnected from the planetary gear device 14, so that the energy loss due to the drag resistance of the engine 10 is prevented as in the operation mode 6, and the motor can be suitably operated with high efficiency with the automatic transmission 26 being suitably shifted. It is also noted that the operation mode 1 is selected, that is, the motor/generator 12 is used as the drive power source, when the currently required output Pd is equal to or smaller than the first threshold value P1 while the electric energy amount SOC stored in the storage device 76 is equal to or larger than the lower limit A1. In this condition, the energy efficiency is higher and the fuel consumption and the amount of exhaust gas emissions can be made smaller when the vehicle is driven by the motor/generator 12 (in the operation mode 1) than when the vehicle is driven by the engine 10 (as in operation mode 2). Further, the electric energy storage device 76 is prevented from excessive discharging with the stored energy amount SOC falling below the lower limit A1, which would result in deterioration of the charging and discharging efficiencies of the storage device 76.

In the operation mode 3 selected in step S12, the first and second clutches 16, 20 are both engaged (turned ON), and the engine 10 is turned ON, while the motor/generator 12 is placed in the CHARGING state to charge the electric energy storage device 76 with regenerative braking, as indicated in FIG. 5, whereby the vehicle is driven by the output of the engine 10 while the electric energy storage device 76 is charged with the electric energy generated by the motor/generator 12. In this operation mode 3, the engine 10 is operated so as to provide an output larger than the currently required output Pd, and the electric current of the motor/generator 12 is controlled so that a surplus output of the engine 10 is consumed by the motor/generator 12 to charge the storage device 76.

If a negative decision (NO) is obtained in step S9, that is, if the currently required output Pd is larger than the first threshold value P1, the control flow goes to step S13 to determine whether the currently required output Pd is smaller than a predetermined second threshold P2 which is larger than the first threshold P1, that is, whether the currently required output Pd is larger than the first threshold P1 and smaller than the second threshold P2, namely, within a predetermined range between P1 and P2. This second threshold value P2 is a boundary value of the output below which the vehicle is driven with only the engine 10 used as the drive power source and above which the vehicle is driven with both the engine 10 and the motor/generator 12 as the drive power source. In other words, the vehicle is considered to be in the medium-load running state if the currently required output Pd is smaller than the second threshold value P2, and in the high-load running state if the currently required output Pd is equal to or larger than the second threshold value P2. For example, the second threshold value P2 is determined by experiments, so as to minimize the exhaust gas emissions and the fuel consumption, depending upon the energy efficiency during running of the vehicle (in which the electric energy storage device 76 may be charged by operation of the engine 10). If the currently required output Pd is larger than the first threshold value P1 and smaller than the second threshold value P2, that is, if an affirmative decision (YES) is obtained in step S13, the control flow goes to step S14 to determine whether the stored electric energy amount SOC is equal to or larger than the above-indicated lower limit A1. If an affirmative decision (YES) is obtained in step S14, the control flow goes to step S15 to select an operation mode 2. If a negative decision (NO) is obtained in step S14, the control flow goes to step S12 to select the operation mode 3 discussed above. If the currently required output Pd is equal to or larger than the second threshold P2, that is, if a negative decision (NO) is obtained in step S13, the control flow goes to step S16 to determine whether the stored electric energy amount SOC is equal to or larger than the lower limit A1. If an affirmative decision (YES) is obtained in step S16, the control flow goes to step S17 to select an operation mode 4. If a negative decision (NO) is obtained in step S16, the control flow goes to step S15 to select the operation mode 2.

In the operation mode 2 selected in step S15, the first and second clutches 16, 20 are both engaged (turned ON), and the engine 10 is operated so as to produce the currently required output Pd, while the motor/generator 12 is placed in the NON-LOAD state, as indicated in FIG. 5, whereby the vehicle is driven with only the engine 10 used as the drive power source.

In the operation mode 4 selected in step S17, the first and second clutches 16, 20 are both engaged (turned ON), and the engine 10 and the motor/generator 12 are operated, as indicated in FIG. 5, whereby the vehicle is driven with both the engine 10 and the motor/generator 12 used as the drive power source. In this operation mode 4 selected when the currently required output Pd is equal to the second threshold P2 or larger, the engine 10 and the motor/generator 12 are both operated as the drive power sources to drive the vehicle, so that the energy efficiency is less likely to be lowered than in the operation mode 1 or 2 in which either the engine 10 or the motor/generator 12 is used as the drive power source. In this respect, the fuel consumption and the exhaust gas emission can be made lower in this operation mode 4 than in the operation mode 1 or 2 when the currently required output Pd is equal to P2 or larger. Further, since the operation mode 4 is selected only when the stored electric energy amount SOC is equal to or larger than the lower limit A1, the electric energy storage device 76 is protected from excessive discharging with the stored energy amount SOC falling below the lower limit A1, which would result in deterioration of the charging and discharging efficiencies of the storage device 76.

As described above, the operation modes 1–4 are selected in the following running states of the vehicle. When the electric energy amount SOC stored in the electric energy storage device 76 is not smaller than the lower limit A1, the operation mode 1 is selected in step S11 to drive the vehicle with only the motor/generator 12 as the drive power source if the vehicle is in the low-load running state with the currently required output Pd being equal to or smaller than the first threshold P1. Further, the operation mode 2 is selected in step S15 to drive the vehicle with only the engine 10 as the drive power source if the vehicle is in the medium-load running state with the currently required output Pd being larger than the first threshold P1 and smaller than the second threshold P2, and the operation mode 4 is selected in step S17 to drive the vehicle with the engine 10 and the motor/generator 12 as the drive power sources if the vehicle is in the high-load running state with the currently required output Pd being equal to or larger than the second threshold P2. When the stored electric energy amount SOC is smaller than the lower limit A1, the operation mode 3 is selected in step S12 to drive the vehicle with only the engine 10 as the drive power source while at the same time charging the electric energy storage device 76 if the vehicle is in the medium-load running state with the currently required output Pd being smaller than the second threshold P2, and the operation mode 2 is selected in step S15 to drive the vehicle with only the engine 10 without charging the storage device 76 if the vehicle is in the high-load running state with the currently required output Pd being equal to or larger than the second threshold P2.

The operation mode 2 is selected in step S15 in the following two cases: 1) when the vehicle is in the medium-load running state wherein the currently required output Pd is larger than the first threshold P1 and smaller than the second threshold P2, while the stored electric energy amount SOC is not smaller than the lower limit A1; and 2) when the vehicle is in the high-load running state wherein the currently required output Pd is equal to or larger than the second threshold P2, while the stored electric energy amount SOC is smaller than the lower limit A1. In the medium-load running state of the vehicle, the energy efficiency is generally higher when the vehicle is driven by the engine 10 than when the vehicle is driven by the motor/generator 12. Accordingly, the fuel consumption and exhaust gas emission can be made smaller in the operation mode 2 than in the operation mode 1. In the high-load running state, it is generally desirable to select the operation mode 4 in which the vehicle is driven by both of the engine 10 and the motor/generator 12. When the electric energy amount SOC stored in the electric energy storage device 76 is smaller than the lower limit A1, however, it is desirable to select the operation mode 2, that is, to drive the vehicle with only the engine 10 used as the drive power source, in order to prevent deterioration of the charging and discharging efficiencies of the storage device 76 due to reduction of the stored electric energy amount SOC below the lower limit A1.

In the drive source brake control of FIG. 8 in the hybrid drive system 8 of the present embodiment, step Q2-2 is implemented to select the operation mode 6, namely, the regenerative braking mode, if the electric energy amount SOC stored in the storage device 76 is smaller than the upper limit A2. In the regenerative braking mode, a drive source brake based on the regenerative braking of the motor/generator 12 is applied to the vehicle. The force of the drive source brake based on the regenerative braking is controlled according to the regenerative braking data map which is selected depending upon the degree of drive source braking (regenerative braking) desired by the vehicle operator. That is, the amount of electric energy generated by the motor/generator 12 as the electric generator is controlled depending upon the operations of the shift lever 80 to the right and left positions while it is placed in the drive source brake position "B". These operations of the shift lever 80 indicate the operator's desired degree of the drive source brake application (regenerative brake application in step Q-2-6). Thus, when the stored electric energy amount SOC is smaller than the upper limit A2, the regenerative braking mode rather than the engine braking mode is established, and the automatic transmission 26 is kept in the predetermined forward drive position (e.g., third-speed position "3rd"), while the data map for determining the regenerative braking force is selected depending upon the desired degree of the regenerative brake application (drive source brake application as desired by the vehicle operator). In the present regenerative braking control according to steps Q2-2 through Q2-6, therefore, the actual generative brake force can be suitably controlled with a higher response to the operator's desired degree of the regenerative brake application (drive source brake application), than in the engine braking control according to steps Q2-7 through Q2-10 in which the automatic transmission 26 is shifted to the position corresponding to the operator/s desired degree of the engine brake application.

When the electric energy amount SOC stored in the storage device 76 is equal to or larger than the upper limit A2, the engine braking control is effected according to steps Q2-8 through Q2-10, so that an engine brake to be applied to the vehicle is controlled by the currently selected position or speed ratio of the automatic transmission 26. Namely, the engine brake is controlled by shifting the transmission to the appropriate position corresponding to the operator's desired degree of the engine brake application. In this engine brake control in the operation mode 8 wherein the motor/generator 12 is held in the NON-LOAD state, the motor/generator 12 is protected from excessive charging and resulting deterioration of the charging and discharging efficiencies.

It is also noted that the regenerative brake produced by the motor/generator 12 in the regenerative brake control according to steps Q2-2 through Q2-6 is controlled to be substantially equal to the engine brake produced by the engine 10 and controlled by the automatic transmission 12. Accordingly, the present hybrid drive system 8 does not suffer from a difference in the drive source brake force due to the selective use of the engine brake and the regenerative brake, which difference would be undesirable to the vehicle operator who does not generally distinguish the regenerative brake and the engine brake from each other.

While the presently preferred embodiment has been described above by reference to the accompanying drawings, by way of example only, it is to be understood that the invention is not limited to the details of the illustrated embodiment, but may be otherwise embodied.

Figure 10:
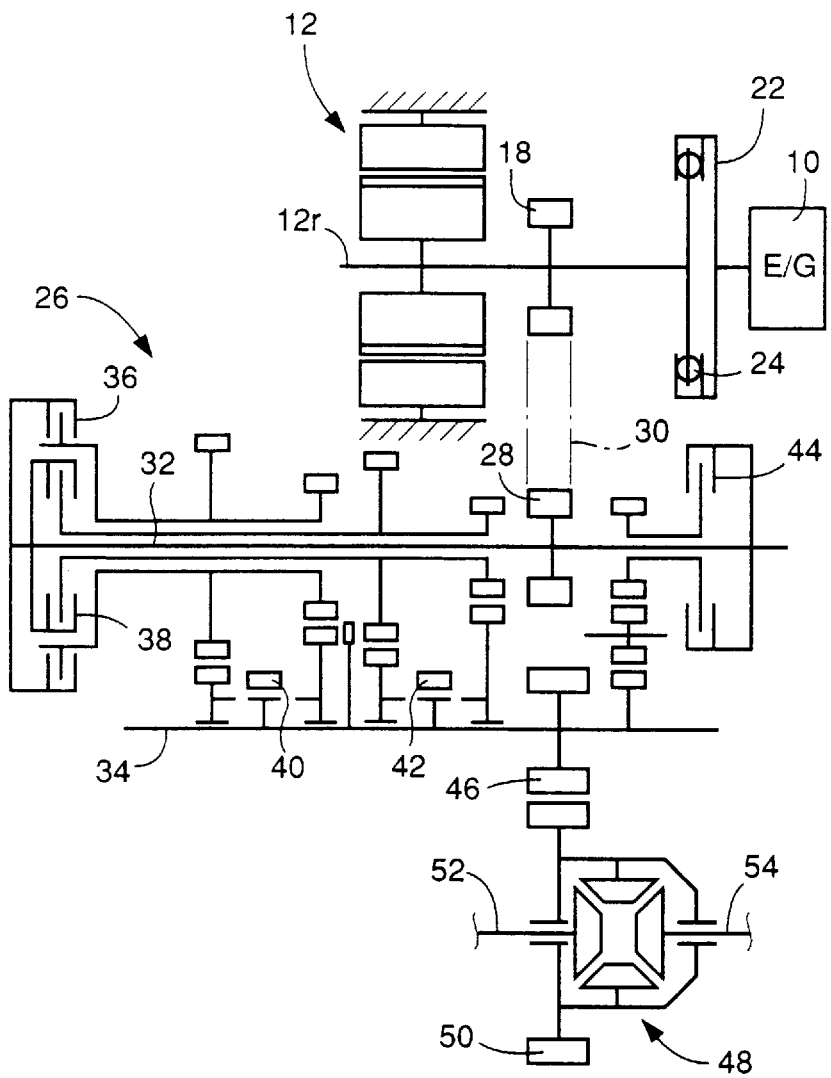
FIG. 10 is schematic view illustrating another type of hybrid vehicle drive system to which the principle of the present invention is applicable.

In the hybrid drive system 8 according to the embodiment of FIG. 1, the outputs of the engine 10 and the motor/generator 12 are synthesized or distributed by the planetary gear device 14. However, the principle of the present embodiment is applicable to various other types of hybrid drive system, such as a hybrid drive system according to a second embodiment shown in FIG. 10, which does not include the planetary gear device 14 and in which the rotor shaft 12r of the motor/generator 12 and the engine 10 are directly connected to each other.

In the illustrated embodiments, there are available four degrees of drive source brake application one of which is selected by the vehicle operator by operating the shift lever 80 placed in the drive source brake position "B". However, it is possible for the operator to select one of five or more different degrees of drive source brake application. For the regenerative brake application by the motor/generator 12, five or more regenerative braking data maps corresponding to the different degrees are stored in the controller 64. For the engine brake application, the actual engine brake force is controlled in five or more steps, which correspond to respective combinations of the output of the engine 12 and the selected speed ratio of the automatic transmission 26. In this respect, it is noted that the number of the selectable degrees of the regenerative brake application need not be equal to the number of the selectable degrees of the engine brake application.

It is to be understood that the present invention may be embodied with various other changes, modifications and improvements, which may occur to those skilled in the art, without departing from the spirit and scope of the invention defined in the following claims:

What is claimed is:

1. An apparatus for controlling a drive source brake force to be applied to a hybrid drive vehicle comprising a drive wheel, a drive power source for driving said drive wheel, and a transmission, said drive power source including an engine operated by combustion of a fuel and an electric motor operated with an electric energy, and said transmission being disposed in a power transmitting path between said engine and said drive wheel, said apparatus comprising:

manually operated means for selecting one of a plurality of different degrees of application of a drive source brake to said hybrid drive vehicle;

electric generator driven by a kinetic energy of the hybrid drive vehicle to generate an electric energy and apply as said drive source brake a regenerative brake force corresponding to the generated electric energy to the vehicle; and electricity generation control means for controlling said electric energy generated by said electric generator so as to produce a regenerative brake force in agreement with one of a plurality of regenerative data maps which simulate engine braking be said engine operated by combustion of a fuel through said transmission, depending upon the degree of application of the drive source brake selected by said manually operated means.

2. An apparatus according to claim 1, wherein said transmission comprises an automatic transmission.

3. An apparatus according to claim 2, wherein the automatic transmission is disposed in a power transmitting path between said drive wheel and an assembly of said engine and said electric generator, said electricity generation control means controls the electric energy generated by said electric generator while said automatic transmission is held in a predetermined position having a predetermined speed ratio.

4. An apparatus according to claim 1, wherein said electric motor and said electric generator are provided by a single motor/generator, which is selectively operated as said electric motor and said electric generator.

5. An apparatus according to claim 1, wherein said transmission is an automatic transmission having a plurality of forward drive positions having respective different speed ratios, and said manually operated means comprises a shift lever having a forward drive position for permitting said automatic transmission to be shifted to any one of said forward drive positions, said shift lever further having a drive source brake position in which said shift lever is operable to designate a desired degree of said drive source brake application to the vehicle.

6. An apparatus according to claim 1, wherein said transmission is an automatic transmission whose speed ratio is variable, said apparatus further comprising:

an electric energy storage device for storing the electric energy by which said electric motor is operated;

engine brake shift control means for shifting said automatic transmission so as to change the speed ratio thereof depending drive so degree of application of the drive source brake selected by said manually operated means, so that an engine brake force which is produced by operation of said engine by said kinetic energy of the hybrid drive vehicle and which is applied to the hybrid drive vehicle through said automatic transmission is controlled depending upon the speed ratio of the automatic transmission; and drive source brake selecting means for selectively enabling said engine brake shift control means and said electricity generation control means to be operated, depending upon an amount of the electric energy stored in said electric energy storage device.

7. An apparatus according to claim 1, wherein said electric motor and said electric generator are provided by a single motor/generator which is selectively operated as said electric motor and said electric generator, said apparatus further comprising:

an electric energy storage device for storing the electric energy by which said electric motor is operated;

a synthesizing/distributing mechanism having a first clutch, an output member, a first rotary element connected to said engine through said first clutch, a second rotary element connected to said motor/generator, and a third rotary element connected to said output member, said automatic transmission being disposed between said output member and said drive wheel;

a second clutch for connecting two elements of said first, second and third rotary elements of said synthesizing/distributing mechanism;

regenerative braking control means for releasing said first clutch while engaging said second clutch, for permitting said motor/generator to be driven as said electric generator by said kinetic energy of the vehicle to charge said electric energy storage device and apply said regenerative brake force to the vehicle; and engine braking control means for engaging said first and second clutches, while holding said motor/generator in a non-load state, for permitting said engine to be driven by said kinetic energy of the vehicle to apply an engine brake to the vehicle as said drive source brake.

8. An apparatus for controlling a drive source brake force to be applied to a hybrid drive vehicle comprising a drive wheel, an electric energy storage device for storing an electric energy, a drive power source for driving said drive wheel, and an automatic transmission whose speed ratio is variable, said drive power source including an engine operated by combustion of a fuel and an electric motor operated with the electric energy supplied from said electric energy storage device, and said automatic transmission being disposed in a power transmitting path between said engine and said drive wheel, said apparatus comprising:

manually operated means for selecting one of a plurality of different degrees of application of a drive source brake to said hybrid drive vehicle;

electric generator driven by a kinetic energy of the hybrid drive vehicle to generate an electric energy and apply as said drive source brake a regenerative brake force corresponding to the generated electric energy to the vehicle;

engine break shift control means for shifting said automatic transmission so as to change the speed ratio thereof depending upon the degree of application of the drive source brake selected by said manually operated means, so that an engine brake force which is produced by operation of said engine by said kinetic energy of the hybrid drive vehicle and which is applied to the hybrid drive vehicle is controlled depending upon the speed ratio of the automatic transmission;

electricity generation control means for controlling said electric energy generated by said electric generator, depending upon the degree of application of the drive source brake selected by said manually operated means; and drive source brake selecting means for selectively enabling said engine brake shift control means to provide braking by said engine operated by combustion of a fuel and said electricity generation control mean to be operated, depending upon an amount of the electric energy stored in said electric energy storage device.

9. An apparatus according to claim 8, wherein said automatic transmission has a plurality of forward drive positions having respective different speed ratios, and said manually operated means comprises a shift lever having a forward drive position for permitting said automatic transmission to be shifted to any one of said forward drive positions, said shift lever further having a drive source brake position in which said shift lever is operable to designate a desired degree of said drive source brake application to the vehicle.

10. An apparatus according to claim 8, further comprising:

a synthesizing/distributing mechanism having a first clutch, an output member, a first rotary element connected to said engine through said first clutch, a second rotary element connected to said motor/generator, and a third rotary element connected to said output member, said automatic transmission being disposed between said output member and said drive wheel;

a second clutch for connecting two elements of said first, second and third rotary elements of said synthesizing/distributing mechanism;

regenerative braking control means for releasing said first clutch while engaging said second clutch, for permitting said motor/generator to be driven as said electric generator by said kinetic energy of the vehicle to charge said electric energy storage device and apply said regenerative brake force to the vehicle; and engine braking control means for engaging said first and second clutches, while holding said motor/generator in a non-load state, for permitting said engine to be driven by said kinetic energy of the vehicle to apply an engine brake to the vehicle as said drive source brake.

11. An apparatus according to claim 8, wherein said regenerative data maps correspond to forward drive positions of said automatic transmission so that said electric generator provides a regenerative brake force that is substantially the same as an engine brake force provided by said engine.

* * * * *